May 5, 1953   J. K. SHANNON   2,637,759
STORAGE BATTERY CELL COVER AND CONSTRUCTION
Filed Feb. 5, 1949   2 SHEETS—SHEET 1

INVENTOR.
JOHN K. SHANNON,
BY Allen & Allen
ATTORNEYS.

May 5, 1953  J. K. SHANNON  2,637,759
STORAGE BATTERY CELL COVER AND CONSTRUCTION
Filed Feb. 5, 1949  2 SHEETS—SHEET 2
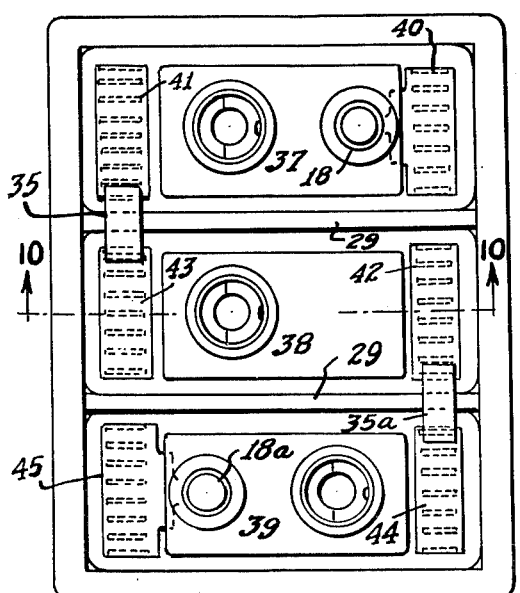
FIG. 11.
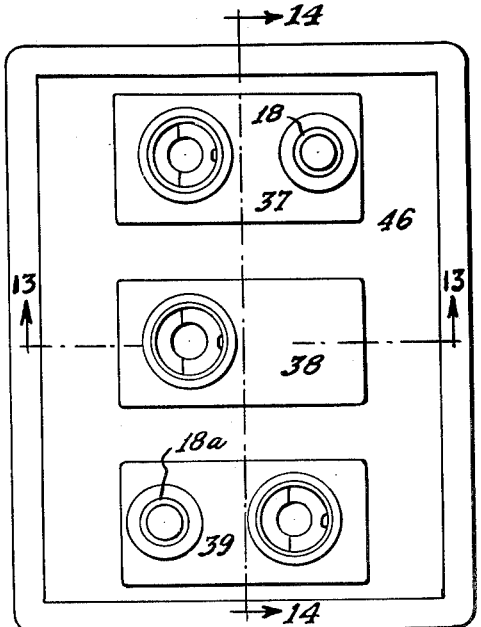
FIG. 12.
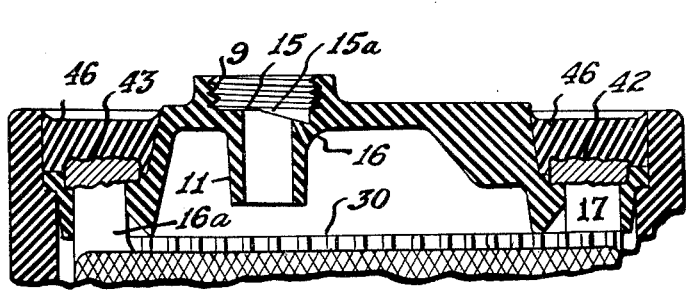
FIG. 13.
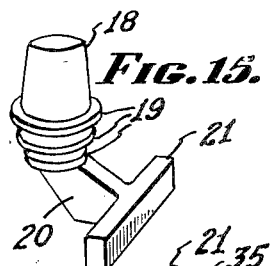
FIG. 15.
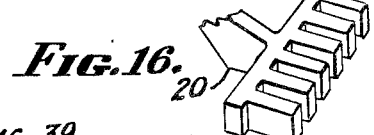
FIG. 16.
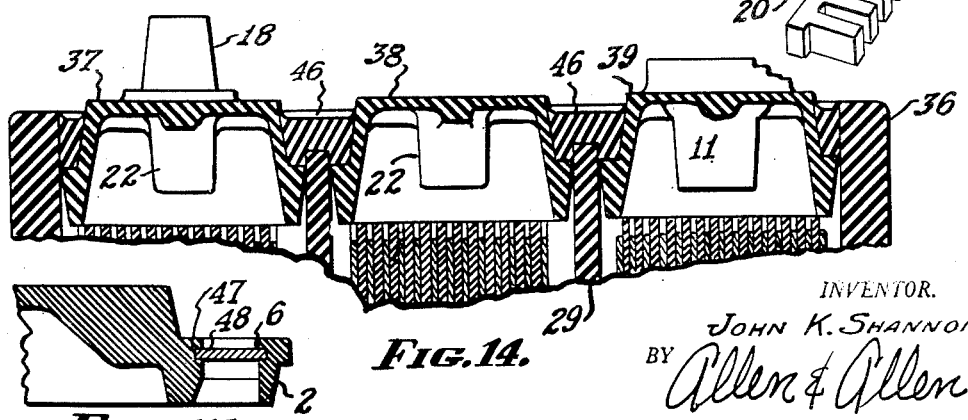
FIG. 14.
FIG. 17.
INVENTOR.
JOHN K. SHANNON,
BY Allen & Allen
ATTORNEYS.

Patented May 5, 1953

2,637,759

UNITED STATES PATENT OFFICE 2,637,759

STORAGE BATTERY CELL COVER AND CONSTRUCTION

John K. Shannon, Kenosha, Wis.

Application February 5, 1949, Serial No. 74,849

5 Claims. (Cl. 136—170)

This application is a continuation-in-part of my copending application entitled Storage Battery, Serial No. 50,713, filed September 23, 1948, and relates to electric accumulators such for example as are employed in automotive vehicles.

A primary object of the invention is to simplify and improve the construction of such accumulators, and in particular to provide a cell cover construction, as well as a combination of cell cover and storage battery case with which a simplification and cheapening of the assembly operations can be accomplished.

These and other objects of the invention which will be set forth hereinafter or will be apparent to one skilled in the art upon reading these specifications, I accomplish in that construction and arrangement of parts of which I shall now describe an exemplary embodiment. Reference is made to the accompanying drawings wherein:

Figure 11 is a top plan view of an accumulator after assembly as hereinafter described, but before the filling in of the sealing compound.

Figure 12 is a top plan view of the completed accumulator.

Figure 13 is a transverse partial section through the center cell taken along section line 13—13 of Figure 12.

Figure 14 is a longitudinal partial section through the accumulator taken along the section line 14—14 of Figure 12.

Figure 15 is a perspective view of one form of terminal member which I may employ.

Figure 16 is a partial perspective view of a modified form of terminal member.

Figure 17 is a detail fragmentary transverse sectional view through a portion of a battery illustrating one method of molding a connector bar directly in a cell cover.

Hitherto in the commercial manufacture of storage batteries, it has been the practice to assemble a plurality of positive and negative plates for each cell in an external jig or holder. The plates are provided along one edge with upstanding integral lugs by which electrical connections are made to the plates, the lugs for the positive plates lying to one side of the assembly and the lugs of the negative plates to the other. The plates of course are assembled with intervening porous separators of suitable type. It has been the practice to burn to the various lugs in the two groups terminal members having upstanding terminal posts.

When the assemblies have been made in the manner indicated, they are placed in the several cells of the storage battery, and cell covers are employed to close the cells. These cell covers are provided with filler openings, and either with openings to accept the upstanding lead terminal posts of the plate assemblies, or with molded-in lead sleeves to accept the terminal posts, and to which the terminal posts may be burned. When the cell covers are placed in position, they are sealed to the storage battery case by a suitable sealing compound. Interconnection between the plates of the cells is made by means of connector bars, perforated at their end to receive certain of the terminal posts, and burned thereto. The result is a storage battery, the top of which presents not only the conventional filler wells, but also terminal posts for all of the plate assemblies in each of the cells, and interconnections between some of them, all such current-carrying parts being electrically exposed.

In the practice of my invention I attain an accumulator, the top of which is devoid of exposed electrical parts excepting for terminal posts for the positive and negative plate assemblies of the two end cells respectively. Thus the top of the storage battery is neater in appearance and more readily kept clean, while the chances of accidental short circuit especially as between adjacent cells is greatly minimized. A stronger construction is obtained, and the assembly of the accumulator is simplified and rendered much less expensive.

Hitherto it has been suggested that the plate and separators might be assembled in the individual cells, and cell covers provided through which the plate lugs might extend, to be burned together above some portion of the cell cover. However in construction of the prior art for this purpose the advantages of the present invention have not been attained, and various disadvantages have been encountered which it is one of the objects of this invention to overcome.

Figure 1:
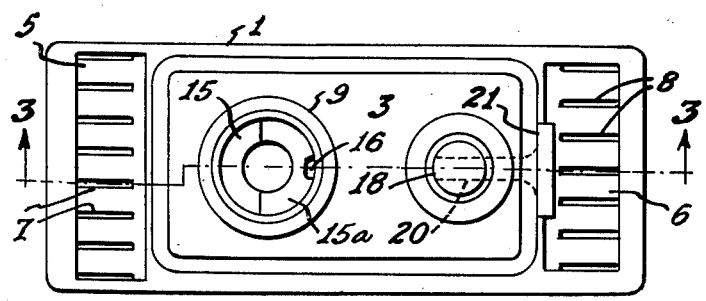
Figure 1 is a top plan view of my cell cover for an outside cell of the accumulator.
Figure 2:
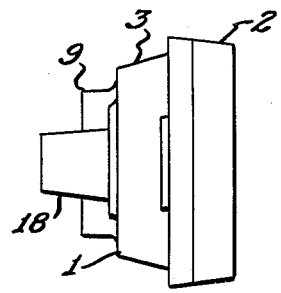
Figure 2 is an end elevational view of the same cover.
Figure 3:
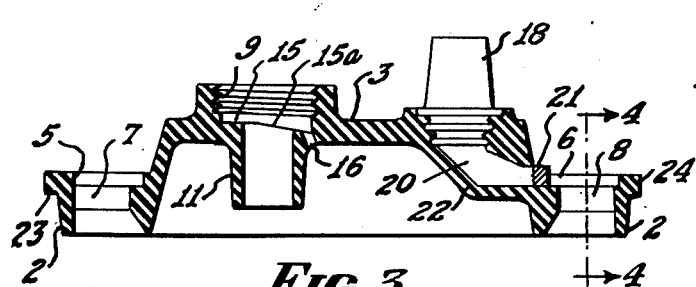
Figure 3 is a longitudinal sectional view taken along the section line 3—3 of Figure 1.
Figure 5:
Figure 5 is a similar sectional view showing a metallic connector member in position.

Figures 1, 2 and 3 illustrate an exemplary form of a cell cover which I employ. This is the cell cover for the end cells of a storage battery. There is a body indicated generally at 1, having a depending skirt 2, preferably inwardly tapered. An interiorly hollow structure 3 rises above the central portion of the body. At the ends of the body there are laterally extending depressions 5 and 6. Slots 7 and 8 open into these depressions and extend downwardly through the body of the cell cover. The slots in the two depressions are respectively spaced to accept lugs on the sides of the positive and negative plates respectively as will be clear from Figure 6.

The hollow portion 3, which may be interiorly reinforced with ribs as desired, forms a gas collection space within the cell cover and above the plates. A filler well 9 of suitable form is provided in the hollow portion 3. It will be understood that the filler well will have a suitable filler cap (not shown) and that it may be made to incorporate any of the non-overfill devices known in the art. The particular one illustrated comprises a tubular member 11, of less diameter than the filler well, extending downwardly from it so as to leave an interior shoulder 15 having a slanting portion 15a taking up the greater portion of the area of the shoulder. A gas passageway 16 is formed through the shoulder. The non-overfill device also comprises a metallic washer such as a washer of lead placed in the filler well and resting on the shoulder. When the filler cap is removed this washer lies by gravity against the slanting portion 15a of the shoulder, closing the gas passageway 16. As a consequence, in filling the cells, when the level of the electrolyte is brought up to the bottom of the tubular extension 11, the cell cannot be filled further, but an addition of water will simply cause the electrolyte to rise within the tubular extension. When the filler cap is placed in position the washer is contacted by it and caused to lie against the shoulder portion 15, thereby opening the gas passageway and venting the cell through gas openings in the filler cap. Such a non-overfill construction is described and claimed in Patent No. 2,233,081 in the name of Keller.

Figure 4:
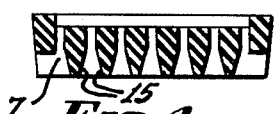
Figure 4 is a transverse sectional view taken along the section line 4—4 of Figure 3.
Figure 6:
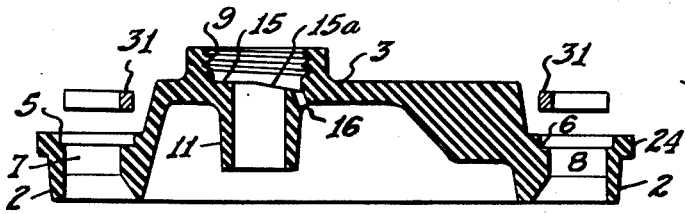
Figure 6 is an exploded transverse sectional view of an accumulator case, a cell cover, and associated parts.

As will be clear from Figure 4 the portions of the cell cover body lying between the slots 7 and 8 are preferably downwardly tapered as at 15 to facilitate insertion of the plate lugs, which lugs are indicated in Figure 6 at 16 and 17.

In the cell covers for the end cells I also mold terminal post structures. These structures, as most clearly shown in Figure 15, comprise a terminal post 18 of suitable size to receive the terminals on the battery leads, at the base of which posts there are formed a series of ridges 19 or other configurations the purpose of which is to anchor the post firmly in the substance of the cell cover. At the bottom of the post there is a sidewise extending neck 20 terminating in a laterally elongated bar-shaped element 21. The lower portion of this terminal post structure is molded into the material of the cell cover, and it is embedded and covered thereby as at 22, excepting that the terminal post proper 18 projects above the top of the hollow member 3, as shown, while the bar element 21 projects into the depression 6.

The skirt 2 at the end of the body 1 is recessed so as to provide a pair of shoulder elements 23 and 24 on the body. The cell cover will be molded from suitable composition such as hard rubber or other material in ways hitherto current in the art. The mold part forming the top of the cell cover will of course be recessed to accept the terminal post 18. The cell covers for the central cell or cells of the storage battery will be formed in similar manner excepting that they will lack the terminal post elements 18, 20, 21. Such a cell cover is illustrated in section in Figures 6, 10, 13 and 14. It may be made in the same mold if desired by inserting a plug to take the place of the terminal post part 18.

My cell covers are preferably employed with molded storage battery cases of usual form, having a bottom, side and end walls, partition elements defining cells, and transverse ribs on the bottom extending upwardly into the cells and serving as supports for the bottoms of the battery plates. The storage battery case, as illustrated in Figure 6 and other figures, preferably has side walls 25 and 26 which are formed near their upper edges with abutments 27 and 28 upon which the shoulders 23 and 24 of the cell cover may rest. The partitions, such as the one shown at 29, preferably terminate below the tops of the side and end walls of the battery case, and at such a level as either to be coplanar with the top of the body 1 of the cell cover or to extend slightly above it.

Figure 6 is illustrative of a mode of assembly of the elements in a storage battery cell. 16 indicates a lug of a plate of one polarity. 17 indicates a lug of a plate of another polarity, and it will be noted that the length of the lug is such (when the bottoms of the plate rest on the bottom ribs of the storage battery case) to bring the tops of the lugs above the levels of the depressions 5 and 6 and preferably somewhat beyond the tops of the partitions 29. A separator between the plates of opposite polarity is indicated at 30.

Figure 7:
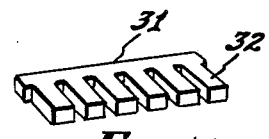
Figure 7 is a perspective view of one form of connector member which I may employ.

After the plates and separators are assembled in the cell, the cell cover may be placed in position, with the plate lugs 16 and 17 extending through the slots 7 and 8. The plate lugs may then be melted off or burned down into the recesses 5 and 6, thus electrically connecting them together, the melted metal forming a cast bar within the recesses 5 and 6.

Where the extension of the plate lugs 16 and 17 upwardly beyond the bottoms of the recesses 5 and 6 is not sufficient to provide the desired mass of metal for electrical conductivity, it is within the purview of my invention either to add additional metal to the recesses 5 and 6 by pouring, or to employ connector bars for this purpose. One such connector bar is shown at 31 in Figure 7. It has a slotted body providing tongues 32 to lie between the plate lugs. Another form of connector bar is shown at 33 in Figure 8, and is slotted as at 34 to accept the ends of the plate lugs. Such connector bars, where used, will be made of metal or alloy similar to the substance of the accumulator plates so as to be fusible therewith by burning. Lead or lead alloy is ordinarily used. Similarly the substance of the terminal post members 18, 20, 21 will be of metal or alloy fusible with the substance of the plate lugs. It will be understood that in the burning, the bar portion 21 of the terminal post element will be fused to the metallic bar lying or formed in the recess 6 so that the terminal post 18 will be in electrical contact with the plate lugs 17.

Where connector bars such as 31 and 33 are employed, it is within the scope of my invention to mold them into the cell cover if desired. I may also form the bar portion of my terminal post member with teeth 35 as shown in Figure 16 so as to produce a connector bar integral with the terminal post structure. This also will be molded into the cell cover, where used. However I do not ordinarily prefer to mold connector bars in the cell covers during their formation, for the reason that portions of the connector bars may become covered with thin films of the molding composition which may interfere with proper flow of the metal during burning. I prefer therefore to add additional metal as may be required by pouring, or else to use separately formed connector bar elements which are put in place just prior to the burning. The exposed bar portion 21 of the terminal post construction may also become covered with a film of the molding composition of the cell cover; but by reason of its shape and position, it is readily cleaned.

It will be seen that in my preferred mode of assembly, I have obviated the use of jigs, and the formation of interconnected plate assemblies outside the storage battery case. The operations in my preferred procedure are very much simpler and less expensive, the storage battery case serving as the jig, and the wells or depressions 5 and 6 in the ends of my cell covers to control the burning and the formation of conductive metallic bars connecting the plate lugs of the several plate series.

Figure 9:
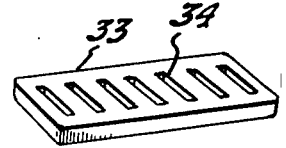
Figure 9 is a perspective view of a jumper, or means for effecting interconnection between cells of the accumulator.
Figure 10:
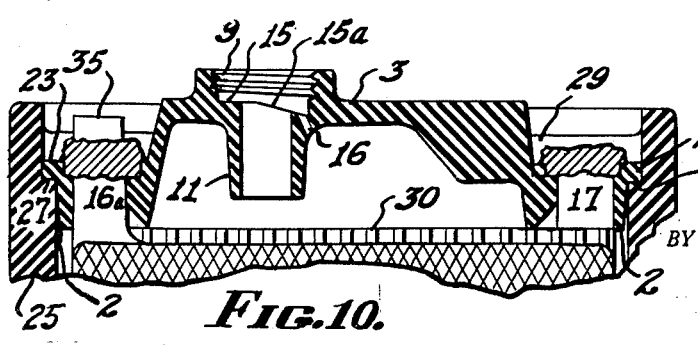
Figure 10 is a transverse sectional view through the middle cell of an assembled accumulator, taken along the section line 10—10 of Figure 11.

It will be understood that interconnections between cells are required, e. g. a connection between the positive plates of one cell, and the negative plates of the next. It has also been indicated as will be most clearly appreciated from Figure 14 that the partitions 29 of the storage battery case do not rise much if at all above the level of the top of the body 1. Interconnections between cells may therefore readily be made across the tops of the partitions by means of jumper elements 35 in Figure 9, which may be placed across the tops of the partitions and burned to the connector bars lying in the recesses 5 and 6.

In Figure 11 I have shown the top of a storage battery assembled as thus far described. The battery case is indicated at 36. It is spanned laterally by the partitions 29. The assembly in this instance comprises three cell covers 37, 38 and 39. By the procedure outlined connector bars have been formed in the recesses at the ends of the cell covers. These connector bars are indicated at 40, 41, 42, 43, 44 and 45. The first connector bar, 40 is integral and in electrical contact with the terminal post 18. The second connector bar 41 is connected to the bar 43 of the cell cover 38 by the jumper 35. This jumper is of course made of metal or alloy fusible with the bars 41 and 43, and merely overlies the top of the partition 29 between cell covers 37 and 38. Similarly the connector bar 42 of cell cover 38 is connected with the bar 44 of cell cover 39 by the jumper 35a. The bar 45 of cell cover 39 is integral and in electrical contact with the battery terminal post 18a.

The next operation, the result of which is illustrated in Figures 12 and 13, is the pouring of sealing compound as at 46. The compound is poured substantially to the height of the upper edges of the side and end walls of the battery case. It covers end portions and narrow side portions of the cell covers, at the same time covering the connector bars 40 to 45, the jumpers 35 and 35a and the partition 29, adequately sealing the cells of the storage battery. Only the hollow central portion of the cell covers 37, 38 and 39 project above the level of the sealing compound 46, as will be apparent from Figure 12. These raised hollow portions contain the filler wells and the two battery terminals. No other electrical parts are exposed.

After assembly as just described, the battery is ready for the introduction of electrolyte through the filler wells, and such forming operations for the accumulator as are incident to its conditioning for use.

Where the connector bars are molded in the cell covers, it is preferred to under-cut the walls of the depressions 5 and 6 as at 47 (see Figure 17). This provides retaining shoulders for the connector bars indicated by the reference character 48 in Figure 17. This forms a strong and durable structure and prevents dislodgement of the connector bars 48 during the assembling of the battery and the burning down of the battery plate lugs.

Figure 8:
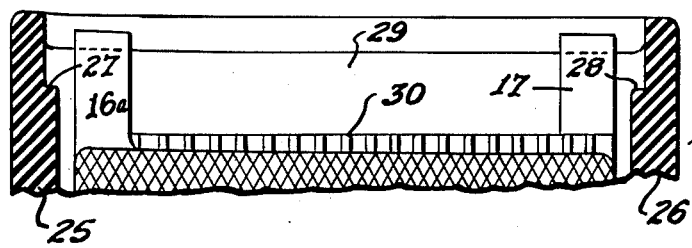
Figure 8 is a perspective view of another form of connector member which I may employ.

Particular stress is laid on that form of my connector bar 33 shown in Figure 8 of the drawings, as certain advantages arise from the use of this bar. The plate lugs are assured of adequate support and upon the burning down thereof the molten material will readily flow over all parts of the connector bar and will be united therewith.

Modifications may be made in my invention without departing from the spirit thereof. Having thus described my invention in certain exemplary embodiments, what I claim as new and desire to secure by Letters Patent is:

1. A storage battery cell cover comprising a body having a peripheral skirt, an interiorly hollow member providing a gas collection space rising above the level of said body centrally thereof, a filler opening formed in said member, end portions of said body having laterally extending recesses with spaced slots extending downwardly through said body to accept the lugs of plates in a cell, and a terminal member comprising a terminal post, a laterally extending neck and a connector member, molded into the interiorly hollow member of said cell cover so that said terminal post extends thereabove and said connector member extends laterally therefrom to the recess at one end of said body, a portion of said connector member lying in proximity to the slots in said recess whereby connection may be effected in said recess between plate lugs extending through said slots and said connector member.

2. The structure claimed in claim 1 wherein said slots terminate downwardly in flaring enlargements serving to guide said plate lugs therethrough.

3. The structure claimed in claim 1 wherein connector bars are molded into said cell cover, said connector bars having openings responding to and in communication with said slots, one of said connector bars being integral with the connector member of said terminal post.

4. The structure claimed in claim 1 wherein said slots terminate downwardly in flaring enlargements serving to guide said plate lugs therethrough, said body at its ends having shoulders adapted to rest upon abutments in a storage battery case.

5. The structure claimed in claim 1 wherein that portion of the connector member which lies in proximity to the slot comprises a transverse connector bar.

JOHN K. SHANNON.

References Cited in the file of this patent

UNITED STATES PATENTS

| Number | Name | Date |
|---|---|---|
| 1,183,810 | Gardiner | May 16, 1916 |
| 1,269,096 | Land | June 11, 1918 |
| 1,329,917 | Marko | Feb. 3, 1920 |
| 1,413,226 | High | Apr. 18, 1922 |
| 1,433,680 | Ford | Oct. 31, 1922 |
| 1,907,420 | Finn | May 2, 1933 |
| 2,052,499 | Strough | Aug. 25, 1936 |
| 2,223,226 | Rieser | Nov. 26, 1940 |
| 2,287,802 | Hill | June 30, 1942 |
| 2,388,042 | Daily | Oct. 30, 1945 |
| 2,450,359 | Sargent | Sept. 28, 1948 |

FOREIGN PATENTS

| Number | Country | Date |
|---|---|---|
| 202,163 | Great Britain | Aug. 16, 1923 |
| 419,460 | Great Britain | Nov. 13, 1934 |
| 434,470 | Great Britain | Oct. 3, 1935 |
| 462,004 | Great Britain | Mar. 1, 1937 |
| 510,238 | Great Britain | July 27, 1939 |